United States Patent
Zheng et al.

(10) Patent No.: US 11,171,766 B2
(45) Date of Patent: Nov. 9, 2021

(54) SYNCHRONIZATION OF ELECTRONIC DEVICES

(71) Applicant: Hewlett Packard Enterprise Development LP, Houston, TX (US)

(72) Inventors: Jiguang Zheng, Beijing (CN); Bo Wang, Beijing (CN); Yuying Chen, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 7 days.

(21) Appl. No.: 16/803,059

(22) Filed: Feb. 27, 2020

(65) Prior Publication Data

US 2021/0273775 A1    Sep. 2, 2021

(51) Int. Cl.
*H04L 7/00* (2006.01)
*H04L 12/10* (2006.01)
*H04W 56/00* (2009.01)

(52) U.S. Cl.
CPC ............ *H04L 7/0008* (2013.01); *H04L 12/10* (2013.01); *H04W 56/001* (2013.01)

(58) Field of Classification Search
CPC ..... H04L 7/0008; H04L 12/10; H04W 56/001
USPC ........................................ 370/464, 498, 503
See application file for complete search history.

(56) References Cited

U.S. PATENT DOCUMENTS

| | | | |
|---|---|---|---|
| 2013/0195116 A1* | 8/2013 | Thorburn | H02J 3/36 370/458 |
| 2020/0007181 A1* | 1/2020 | Stahlin | H04B 17/20 |

FOREIGN PATENT DOCUMENTS

| | | |
|---|---|---|
| CN | 101667010 | 3/2010 |
| CN | 102075330 | 5/2011 |
| WO | WO-03081810 | 10/2003 |

OTHER PUBLICATIONS

Crossley, P.A. et al., Time Synchronization for Transmission Substations Using GPS and IEEE 1588, (Research Paper), CSEE Journal of Power and Energy Systems, Sep. 8, 2016, pp. 91-99, vol. 2, No. 3.

(Continued)

*Primary Examiner* — Obaidul Huq
(74) *Attorney, Agent, or Firm* — Hewlett Packard Enterprise Patent Department

(57) ABSTRACT

Embodiments of the present disclosure relate to a power supply device, an electronic system and a method. The electronic system comprises an electronic device and the power supply device transmitting synchronization information from a satellite to the electronic system. The power supply device comprises a first modulator configured to receive a signal from a satellite and to generate a first modulated supply voltage, a level pattern of the first modulated supply voltage indicating synchronization information included in the satellite signal; and a first transformer configured to provide the first modulated supply voltage to an electronic device to enable a synchronization between the satellite and the electronic device based on the synchronization information. The electronic device demodulates the first modulated supply voltage to determine the synchronization information for synchronizing with the satellite. By using the embodiments of the disclosure, cost for manufacturing the electronic devices can be significantly reduced.

18 Claims, 7 Drawing Sheets

(56) References Cited

OTHER PUBLICATIONS

GNSS Compass Reference Manual, (Research Paper), Jan. 23, 2018, 83 Pgs.
RU172628 U1, Time Sync Server; Assignee: N/A; Filed: Nov. 15, 2016; Published: Jul. 17, 2017, 5 Pgs.

* cited by examiner

SYNCHRONIZATION OF ELECTRONIC DEVICES

BACKGROUND

The Internet-of-Things (IoT) has led to the explosion and proliferation of electronic devices. Various devices of IoT exchange data though networks such as the Internet. For example, for surveillance purposes, some devices may monitor the environment to capture images or videos and then communicate the captured images or videos to a remote device(s) via the Internet. Those devices usually need to acquire time and/or location information and incorporate such information into the communicated data. Traditionally, the devices receive satellite signals from a satellite system such as a Global Positioning System (GPS) by means of satellite receivers and then acquire the time and/or location information based on the received satellite signals.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

DETAILED DESCRIPTION

As described above, conventionally, the devices to be synchronized, such as those in the IoT, are equipped with their respective satellite receivers such as GPS receivers to acquire synchronization information from the satellite signal. The synchronization information comprises time and/or location information, for example, in the form of a series of pulses. However, deploying satellite receivers will significantly increase the cost and result in complicated system design. For example, it is expensive to provide a satellite receiver for a powered device of Power over Ethernet (PoE).

Various embodiments of the present disclosure are directed to power supply devices, electronic devices, electronic systems and methods for communication of synchronization information.

The inventors have found that it is tolerable for some devices to receive supply voltages in a certain range. For example, the powered devices of Power of Ethernet (PoE) are capable of operating at a voltage in a range of 37V-57V according to protocols of PoE. Accordingly, it is proposed herein to modulate amplitude of the voltage supplied from the power supply device to the electronic devices, such that the level pattern of the modulated supply voltage can reflect the synchronization information in the form of pulses. Upon receipt of the power with the modulated supply voltage, the electronic devices demodulate the modulated supply voltage to determine the synchronization information and operate with the received power at the same time.

In this way, it is only necessary to deploy a satellite receiver onto a power supply device which supplies power to a plurality of electronic devices. The power supply device obtains and provides synchronization information based on the received satellite signal. Without equipping each of the plurality of electronic devices with a satellite receiver, the cost of deploying and maintaining the device and the entire system such as the IoT can be reduced.

In some embodiments, the electronic device may comprise an adjustor, such as a phase shifter for example. The adjustor may correct the demodulated time information to compensate for the signal transmission delay. As such, the extracted time information may be more accurate.

Other advantages of embodiments of the present disclosure will be described with reference to the example implementation below.

Reference is made below to FIG. 1 through FIG. 11 to illustrate basic principles and several example embodiments of the present disclosure herein. Unless specified or limited otherwise, the term "a level pattern of a voltage" and variations thereof refer to a pattern comprising at least two voltage levels modulated in a manner of amplitude modulation.

Figure 1:
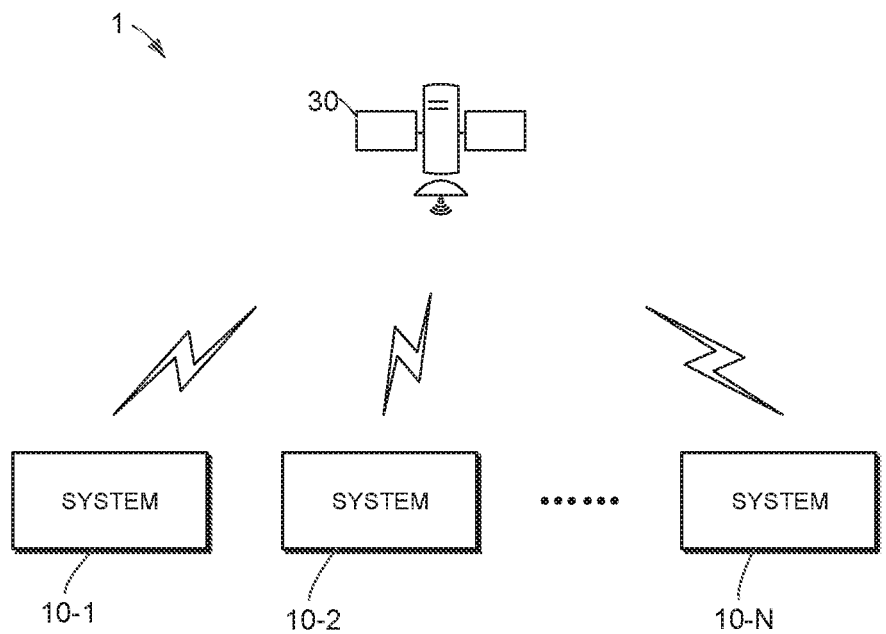
FIG. 1 illustrates a schematic block diagram illustrating an example environment in which the technology described herein may be implemented.

FIG. 1 illustrates a schematic block diagram illustrating an example environment 1 in which the technology described herein may be implemented. The environment 1 at least comprises a satellite 30 and at least one system 10-1, 10-2, . . . , 10-N (collectively referred to as "system 10"), where N represents an integer greater than zero. The satellite 30 may be a satellite of the global navigation satellite system (GLASS), such as a GPS system, Galileo satellite navigation system and so on. In some embodiments, the at least one system 10-1, 10-2, . . . , 10-N may be PoE systems, for example.

It is to be understood that although PoE systems are described herein, it is only for the purpose of illustration without suggesting any limitations as to the scope of the present disclosure. In other embodiments, the environment 1 may comprise more systems, and one or more of those systems can be any suitable systems other than PoE.

Figure 2:
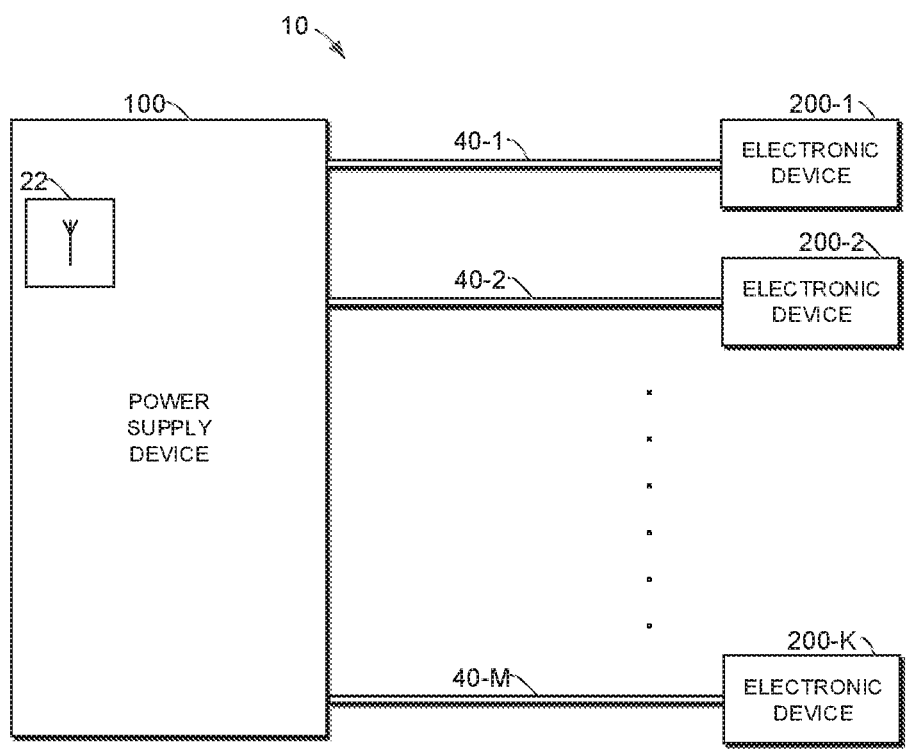
FIG. 2 illustrates an example system in accordance with some example embodiments of the present disclosure.

FIG. 2 illustrates an example system 10 in accordance with some example embodiments of the present disclosure. In the shown embodiment, the system 10 comprises a power supply device 100, at least one connection/link 40-1, 40-2, ..., 40-M (collectively referred to as "connection 40"), and at least one electronic device 200-1, 200-2, ..., 200-K, where M and K each represent an integer greater than zero. In some embodiments, the power supply device 100 is a PoE switch, and the electronic device(s) 200 is a powered device of PoE, such as surveillance cameras of PoE. In those embodiments, one or more connections 40 may be cables such as CAT5, CAT5E and/or CAT6 cables.

The connection(s) 40 may be set up between terminals of the power supply device 100 and the electronic device(s) 200. Examples of the terminals include, but are not limited to, RJ45 terminals.

It is understood that although the PoE switch is illustrated, it is only for the purpose of illustration without suggesting any limitations as to the scope of the present disclosure. For example, the power supply device may be a PoE injector. In this example, the at least one electronic device 200-1, 200-2, ..., 200-N may comprise only one powered device of PoE.

The power supply device 100 is communicatively coupled to a satellite receiver 22 which can receive satellite signals from the satellite 30 and generate a series of pulses based on the received satellite signals. The series of pulses may vary between logical "1" and logical "0" over time to reflect the synchronization information. In some embodiments, as shown, the satellite receiver 22 is incorporated into the power supply device 100 as an internal component. Alternatively, in other embodiments, the satellite receiver 22 may be located remotely to the power supply device 100.

The satellite signals comprise synchronization information, such as time information, location information and the like. For example, in some embodiments, the time information may comprise one pulse per second (1 pps) information and the time of day (ToD) information. The location information may comprise the longitude and the latitude, for example.

The power supply device 100 is able to modulate the supply voltage based on the synchronization information. Then the power supply device 100 provides the modulated supply voltage to the electronic device(s) 200 via the connection(s) 40.

Each electronic device 200 is configured to receive the modulated supply voltage and to demodulate the received modulated supply voltage to obtain the synchronization information, Based on the obtained synchronization information, the electronic device 200 may be synchronized with the satellite 30. For example, the local time information and/or location information of the electronic device 200 can be aligned to the time information and/or the location information based on the satellite signal.

Figure 3:
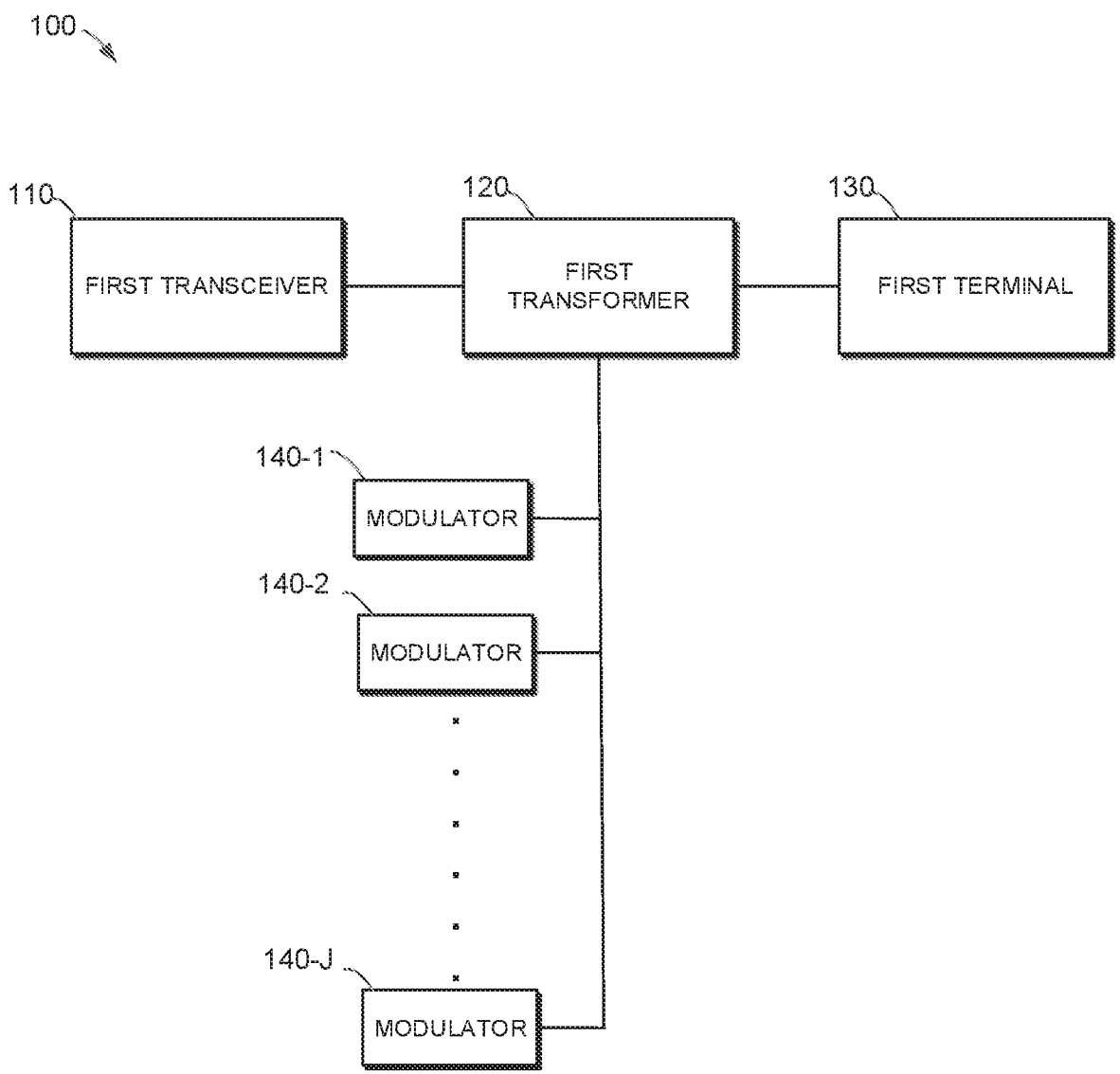
FIG. 3 illustrates a block diagram of an example implementation of a power supply device in accordance with some example embodiments of the present disclosure.

FIG. 3 illustrates a block diagram of an implementation of the power supply device 100 in accordance with some example embodiments of the present disclosure. As shown, the power supply device 100 comprises a first transceiver 110, a first transformer 120, one or more modulators 140-1, 140-2, ..., 140-J where J represents a natural number (collectively referred to as "modulator 140"), and a first terminal 130.

The first terminal 130 is coupled to the respective connection 40 and may be implemented as an RJ45 terminal, for example. The first transceiver 110 is coupled to the first transformer 120 and configured to communicate data with the electronic device 200 via the connection 40.

In some embodiments, the data is communicated in a form of an AC signal through the connection 40, and the synchronization information modulated onto the supply voltage is in a form of a DC signal. The AC signal is superimposed on the modulated supply voltage without interfering with the modulated supply voltage. As such, the power supply device 100 may be compatible with conventional electronic devices because the data will be communicated in a conventional manner without being affected by the modulated supply voltage.

The one or more modulators 140 are each coupled to the satellite receiver 22 to receive the satellite signals from the satellite 30 and to generate a modulated supply voltage based on the satellite signals. Example embodiments of generating the modulated supply voltage will be described below with reference to FIG. 4.

Each modulator 140 is configured to modulate a certain type of synchronization information as required by the electronic device(s) 200, By way of example, the modulator 140-1 may be configured to modulate time information while a different modulator 140-2 may be configured to modulate the second type of synchronization information.

In this example, the modulator 140-1 generates a first modulated supply voltage carrying the time information in the satellite signal. The first modulated supply voltage is provided to the first transformer 120. The modulator 140-2 generates a second modulated supply voltage carrying the location information in the satellite signal. The second modulated supply voltage is provided by the first transformer 120.

Alternatively, in other embodiments, it is also feasible to use a single modulator 140 to modulate different types of synchronization information, for example, in a time division multiplexing manner. In such embodiments, the cost for manufacturing the power supply device can be further reduced.

As described above, in some embodiments, the synchronization information is in a form of a series of pulses. The series of pulses may comprise a logical high value and a logical low value, and may vary between them over time to reflect the synchronization information. For example, the modulator 140 may receive the satellite signal at a first logical value at a first time and generate the first modulated supply voltage at a first level. The first logical value may be the logical high value, and the first level may be a relatively high voltage such as 57V, for example. The modulator 140 may receive the satellite signal at a second logical value at a second time later than the first time, and generate the first modulated supply voltage at a second level below the first level. The second logical value may be the logical low value, and the second level may be a relatively low voltage such as 44V, for example. It is to be understood that any specific numerals described herein are merely for the purpose of illustration, without suggesting any limitations as to the scope of the present disclosure.

Through the above discussion, it will be appreciated that by coupling the satellite receiver to the power supply device and modulating the supply voltage based on the synchronization information included in the satellite signal in a manner of amplitude modulation, embodiments of the present disclosure do not require equipping each device with a satellite receiver. In this manner, the cost of manufacturing the electronic devices and the system can be significantly reduced.

Also, some of the electronic devices will be deployed indoors. For example, some surveillance cameras of PoE are deployed inside a shopping mall. Even if those electronic devices are equipped with the satellite receivers, the acquisition of the synchronization information will be impacted due to the weak satellite signal indoors. Rather, according to embodiments of the present disclosure, electronic devices 200 can work properly as long as the electronic devices 200 can receive the modulated supply voltage from the power supply device 100.

For example, the power supply device 100 comprising a satellite receiver 22 can be located outside the shopping mall to receive the satellite signals. Any electronic devices 200 deployed within the mall can receive the modulated synchronization information via the respective connections 40. As such, the environment and physical application ranges of the electronic devices 200 are extended.

Such an extension of application ranges is especially desirable in IoT. It is usually expected that the devices of IoT can be adapted for various environments comprising shopping malls, streets, and forests and so on. Embodiments as described herein allow the electronic devices 200 to be used in various environments and situations.

Moreover, although the supply voltage provided to the electronic device(s) 200 is modulated by the power supply device 100 according to the embodiments herein, the modulated supply voltage is modulated in the tolerable voltage range for conventional electronic devices. If a conventional electronic device is connected to the power supply device 100, the conventional electronic device may operate properly with the modulated supply voltage, although it cannot demodulate the modulated supply voltage. In addition, for electronic devices of PoE, the data are communicated in a form of an AC signal, as described above. In contrast, the modulation of the synchronization information is modulated on the DC supply voltage in a manner of amplitude modulation. In this case, even if the modulated supply voltage is supplied from the power supply device 100 to an electronic device of PoE comprising no demodulation function, modulation for the supply voltage has no impact on the data communication, and the electronic device may still operate with the modulated power supply voltage and communicate data with the power supply device of PoE properly.

On the other hand, if a supply voltage without modulation is provided to the electronic device 200, the electronic device 200 cannot demodulate the synchronization information, because no synchronization information is carried in the supply voltage. But the electronic device 200 is able to be powered to communicate data, as a conventional electronic device operates. In this case, the electronic device 100 may also be connected to a conventional power supply device to receive power supply voltage from the conventional power supply device and communicate data with the conventional power supply device. Thus, since the power supply devices and the electronic devices are originally designed to connect for providing power and the voltages are modulated in an acceptable range for conventional electronic devices according to the embodiments herein, the solutions according to the embodiments herein will have good compatibility for conventional designs.

Figure 4:
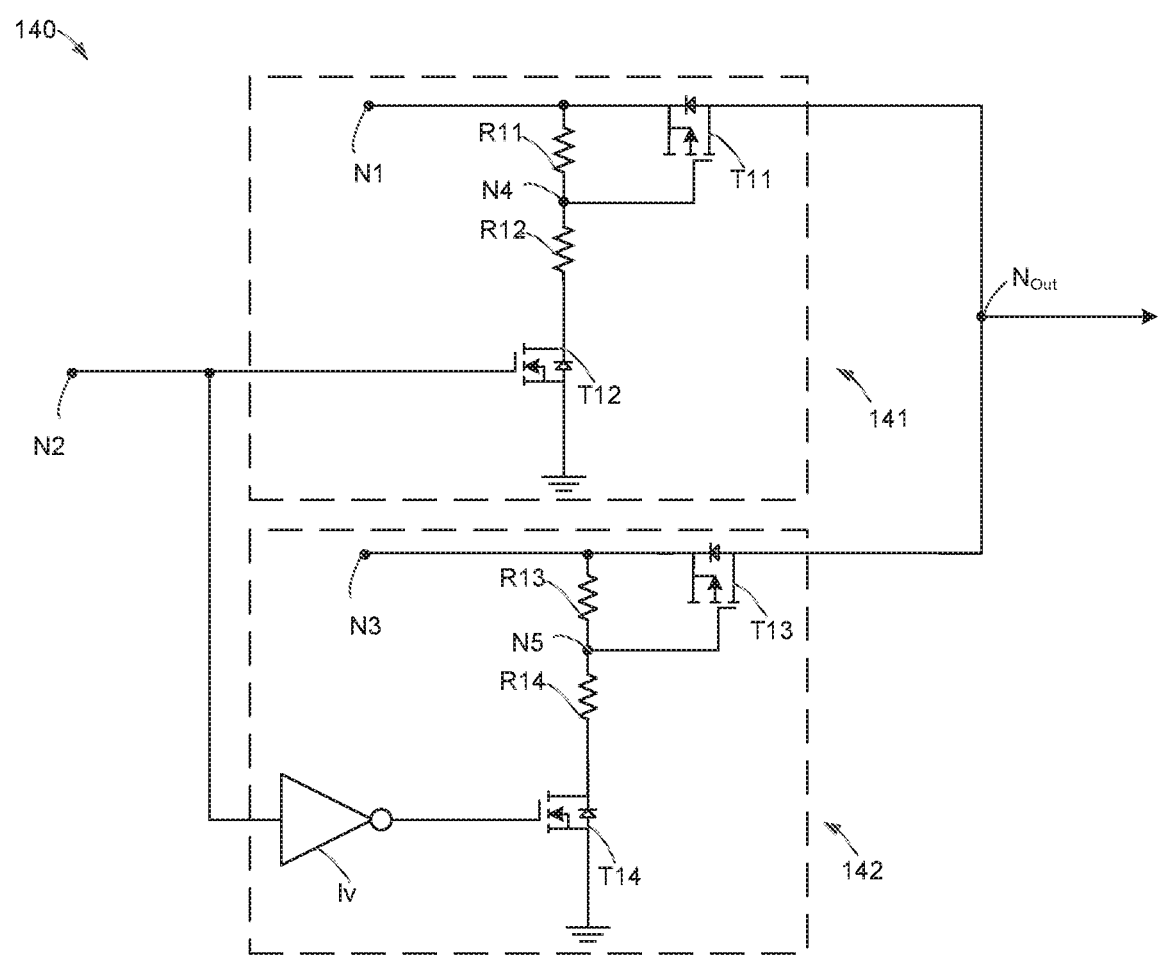
FIG. 4 illustrates a schematic diagram of an example implementation of a modulator in accordance with some example embodiments of the present disclosure.

FIG. 4 illustrates a schematic diagram of the modulator 140 in accordance with some example embodiments of the present disclosure. By way of example, the modulator 140 may be configured to modulate time information, and there is another modulator 140 configured to modulate location information.

As shown, the modulator 140 generally comprises a first circuit 141 and a second circuit 142. The first circuit 141 is configured to receive the satellite signal from the satellite 30. If the received satellite signal is a first logical value, the first circuit 141 generates a first level of the level pattern The second circuit 142 is configured to receive the satellite signal from the satellite 30. If the received satellite signal is a second logical value, the second circuit 142 generates a second level of the level pattern. The second level is below the first level, and the first and second levels are generated in a temporally interleaved manner to form the level pattern of the first modulated voltage.

In some example implementations, the first circuit 141 may comprise a first transistor T11, a first resistor R11, a second resistor R12, and a second transistor T12. The first transistor T11 may be a P-type metal oxide semiconductor field effect transistor (MOSFET), and the second transistor T12 may be an N-type MOSFET in some embodiments. Other semiconductor switches are possible as well.

The first transistor T11 is coupled between a first node N1 and the output node $N_{Out}$. The first node N1 is provided with a voltage of a first level by a first voltage converter (not shown). The first resistor R11 is coupled between the first node N1 and a fourth node N4. The fourth node N4 is coupled to the control terminal of the first transistor T11. The second resistor R12 is coupled between the fourth node N4 and a second transistor T12. The second transistor T12 is coupled between the second resistor R12 and the ground. The control terminal of the second transistor T12 is coupled to a second node N2 configured to receive the satellite signal from the satellite.

If the satellite signal arriving at the second node N2 is logical high (e.g., value "1"), the second transistor T12 is turned on. Accordingly, the current flows from the first node N1 through the first and second resistors R11 and R12. As such, the voltage at the fourth node N4 turns on the first transistor T11. As a result, the output node $N_{Out}$ will have a voltage substantially the same as the voltage of the first level at the first node N1.

If the satellite signal arriving at the second node N2 is logical low (e.g., value "0"), the second transistor T12 is turned off. Accordingly, the first transistor T11 turned off. At this time, the output node $N_{Out}$ receives no voltage from the first transistor T11, and the voltage at the output node $N_{Out}$ is from the second circuit 142, as described below.

The second circuit 142 may comprise a third resistor R13, a third transistor T13, a fourth resistor R14, a fourth transistor T14 and an inverter iv. The third transistor T13 may be a P-type MOSFET, and the fourth transistor T14 may be an N-type MOSFET in some embodiments. Similarly, other semiconductor switches are possible as well.

The third transistor T13 is coupled between a third node N3 and the output node $N_{Out}$. The third node N3 is provided with a voltage of a second level by a second voltage converter (not shown). The second level is lower than the first level in some embodiments. The third resistor R13 is coupled between the third node N3 and a fifth node N5. The fifth node N5 is coupled to a control terminal of the third transistor T13. The fourth resistor R14 is coupled between the fifth node N5 and the fourth transistor T14. The fourth transistor R14 is coupled between the fourth resistor R14 and the ground. The inverter Iv is coupled between the second node N2 and a control terminal of the fourth transistor T14.

If the satellite signal arriving at the second node N2 is logical high, the inverter Iv inverts it into logical "0", and the fourth transistor 114 is turned off. Accordingly, the third transistor T13 is turned off. At this time, the output node $N_{Out}$ receives no voltage from the third transistor T12, and the voltage at the output node $N_{Out}$ is from the first circuit 141, as described above.

If the satellite signal arriving at the second node N2 is logical low, the inverter Iv inverts it into logical "1", and the fourth transistor 114 is turned on. Accordingly, the current flows from the third node N3 through the third and fourth resistors R13 and R14. As such, the voltage at the fifth node N5 turns on the third transistor T13. As a result, the output node $N_{Out}$ will have a voltage substantially the same as the voltage of the second level at the third node N3.

In the embodiments as shown in FIG. 4, the first and second circuits 141, 142 can be implemented with simple structure that can generate a modulated supply voltage based on the synchronization information without significantly increasing cost. In addition, due to the simplicity of the circuit structure, transmission delay for signals can be stable, predictable and reduced. In other words, time for transmission of the signal from the second node N2 to the output node $N_{Out}$ can be accurately predicted. As a result, the synchronization accuracy may be increased.

It is to be understood that the configuration of the modulator 140 as shown in FIG. 4 is only for illustration, without suggesting any limitations as to the scope of the present disclosure. It could be understood that another configuration for a modulator can also apply, as long as it can generate the modulated supply voltage based on the synchronization information. For example, the P-type and N-type transistors in FIG. 3 may be replaced with N-type transistors and P-type transistors respectively, and the inverter Iv is moved between the second node N2 and control terminal of the second transistor 112.

Figure 5:
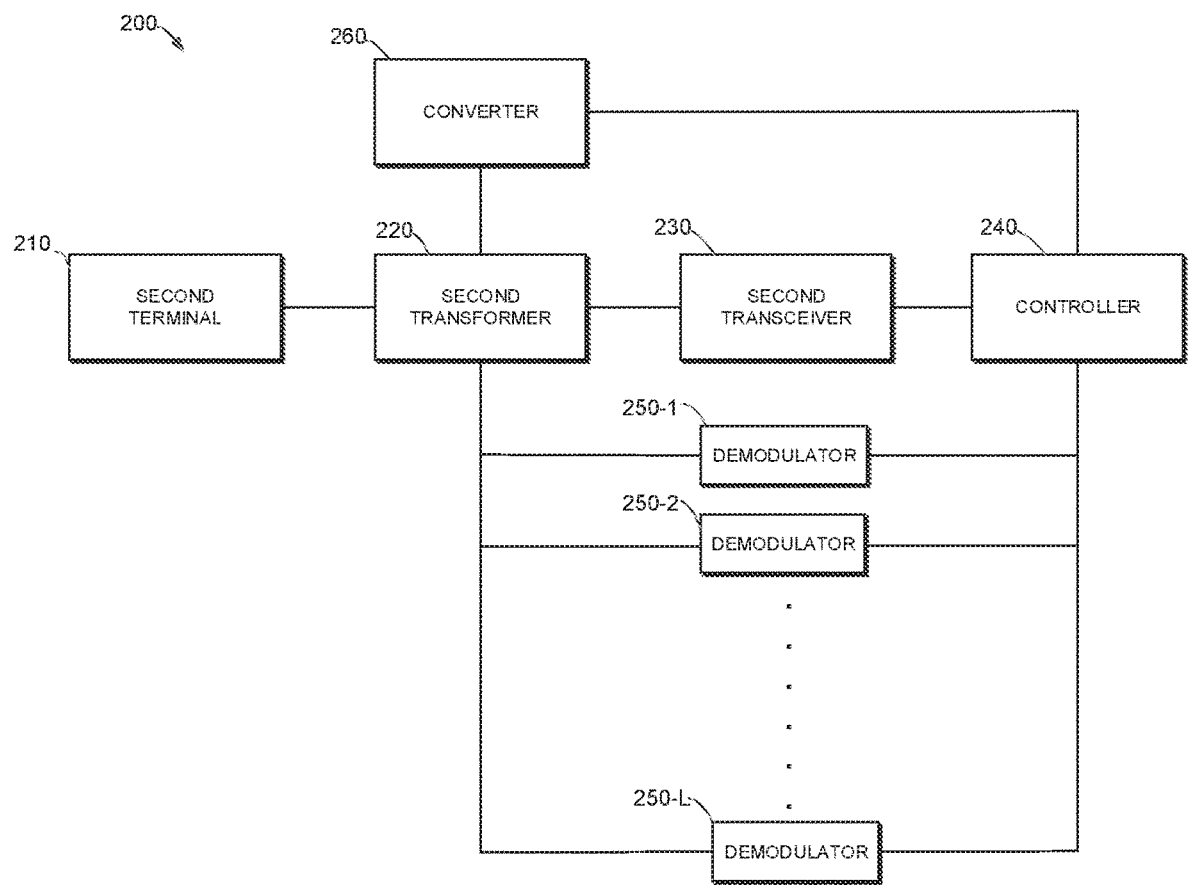
FIG. 5 illustrates a block diagram of an example implementation of the electronic device in accordance with some example embodiments of the present disclosure.

FIG. 5 illustrates a block diagram of an implementation of electronic device 200 in accordance with some example embodiments of the present disclosure. As shown, the electronic device 200 comprises a second terminal 210 coupled to the connection(s) 40, a second transformer 220, a second transceiver 230, a controller 240, a voltage converter 260 and at least one demodulator 250-1, 250-2, . . . 250-L, where L represents a natural number (collectively referred to as "demodulator 250").

The second terminal 210 is coupled to the respective connection 40 and may be implemented as an RJ45 terminal, for example. The first modulated voltage may be provided via the second terminal 210 to the second transformer 220. The voltage converter 260 is configured to convert the received modulated supply voltage into a voltage suitable for operation of components of the electronic device 200. Merely by way of example, the converter 260 is configured to convert the first modulated supply voltage in a range from 44V to 57V into a converted voltage of substantially 12V. The converted voltage can be supplied to the controller 240. The second transceiver 230 is configured to communicate data with the first transceiver 110 and the controller 240.

It will be appreciated that the one or more demodulator 250 may be provided corresponding to the one or more modulator 140 in some embodiments. Each demodulator 250 is configured to demodulate a certain type of synchronization information. Alternatively, in other embodiments, it is also feasible to use a single demodulator 250 to modulate different types of synchronization information, for example, in a time division multiplexing manner.

The controller 240 is configured to synchronize the electronic device 200 with the satellite 30 based on the synchronization information. In some embodiments, the controller 240 may align the local time information to the time information from the satellite signal of the satellite. Although the controller 240 is illustrated, this is only for illustration without suggesting any limitations as to the scope of the present disclosure. As an example, the controller 240 may be replaced by a processing unit, such as a CPU.

It will be appreciated that the cost of designing and manufacturing the electronic devices 200 can be reduced, and the environment and physical application range can be extended with good compatibility.

Figure 6:
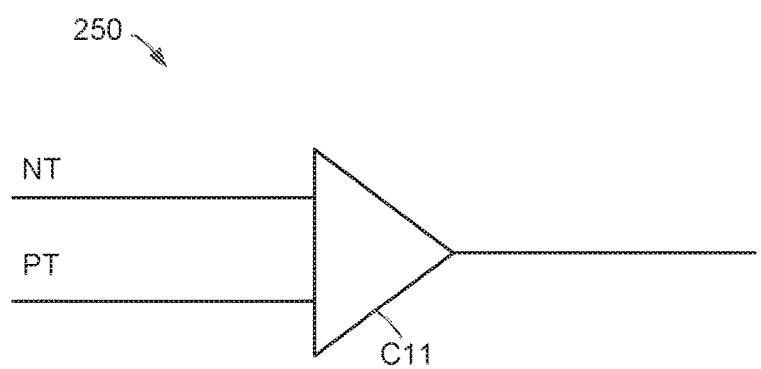
FIG. 6 illustrates a schematic diagram of an example implementation of a demodulator in accordance with some example embodiments of the present disclosure.

FIG. 6 illustrates a schematic diagram of an example implementation of the demodulator 250 in accordance with some example embodiments of the present disclosure. As shown, the demodulator 250 comprises a comparator C11. The comparator C11 comprises a first terminal NT to receive the first modulated supply voltage, and a second terminal PT to receive a predetermined voltage. The comparator C11 is configured to compare the first modulated supply voltage with the predetermined voltage to determine logic values of the synchronization information.

In some example embodiments, the predetermined voltage is set to be 47V; given that the first modulated supply voltage of 57V at the power supply device 100 may fall by a certain voltage drop when it arrives at the electronic device 200. For PoE transmission, the voltage drop is generally below 7V. Thus, for a voltage of 57V at the power supply device 100, the voltage that arrives at the electronic device 200 is generally higher than 50V, and the predetermined voltage of 47V can prevent mistakes in logical values.

In other words, the comparator C11 outputs a logical high value if the first modulated supply voltage received by the comparator C11 is higher than 47V, and the comparator C11 outputs a logical low value if the first modulated supply voltage received by the comparator C11 is below 47V.

The demodulators 250 may be implemented with a simple circuit without significantly increasing cost. In addition, due to the simplicity of the circuit structure, transmission delay for signals can be reduced and is predictable. In other words, time for transmission through the demodulator can be predicated. As such, synchronization accuracy may be increased, as further described below with reference to FIG. 7.

Figure 7:
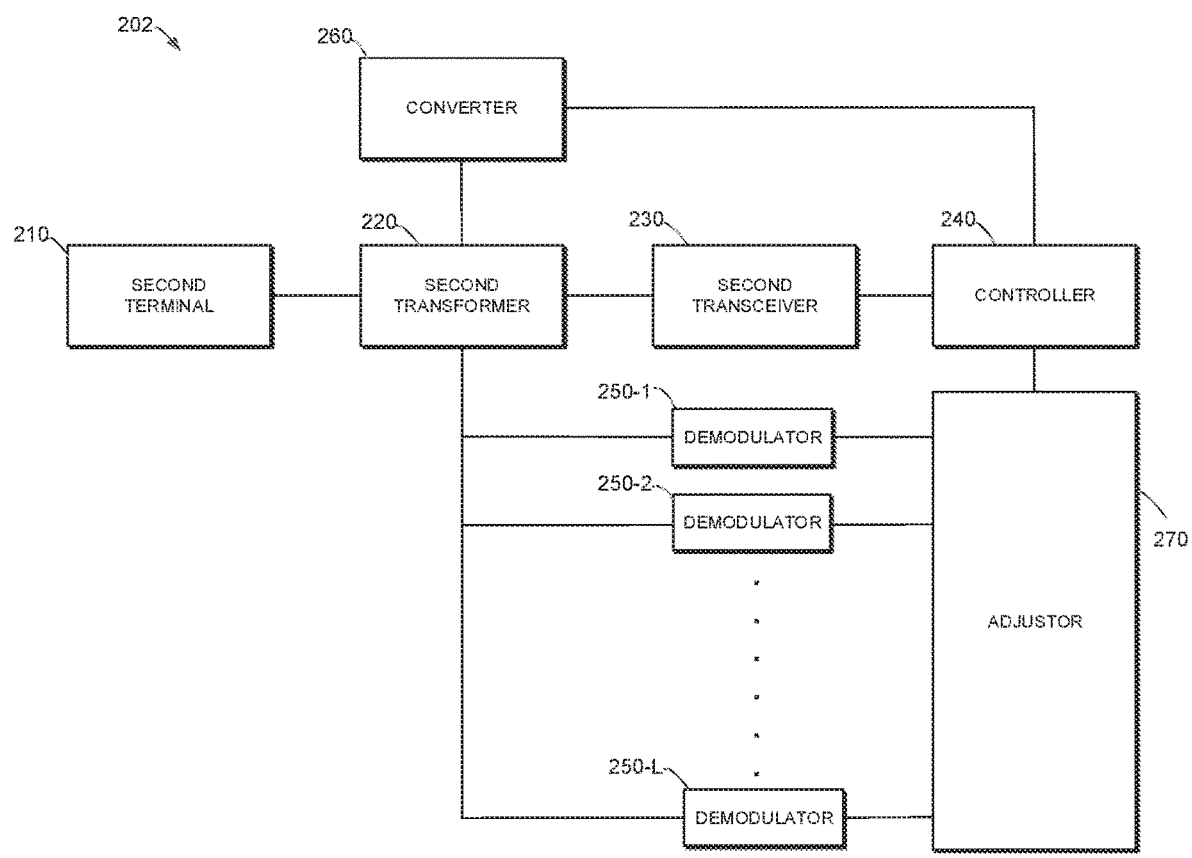
FIG. 7 illustrates a block diagram of a further example implementation of the electronic device in accordance with some example embodiments of the present disclosure.

FIG. 7 illustrates a block diagram of a further example implementation of the electronic device 202 in accordance with some example embodiments of the present disclosure. The electronic device 202 is similar to the electronic device 200 except for the adjustor 270. Thus, similar or same components will not be described below for brevity.

In some embodiments, the adjustor 270 is a phase shifter. The adjustor 270 is coupled between the demodulator unit 250 and the controller 240 and configured to adjust time information of the synchronization information based on transmission delay from the first modulator to the first demodulator. Although the adjustor 270 is illustrated to be a phase shifter, it is only for the purpose of illustration without suggesting any limitations as to the scope of the present disclosure. For example, operation of the adjustor 270 may be performed by the controller 240 to adjust the time information based on the predetermined delay.

Signal transmission consumes time, even if it is at an order of nanoseconds. Thus, the time information demodulated by the electronic device 200 may be inaccurate to a certain degree, due to delay of signal transmission. Merely by way of example, the connection 40 for coupling PoE devices is generally limited to a length of not more than 100 meters. Assuming that the length of the connection 40 is 100 meters, the signal transmitted through the connection 40 will consume 333 ns. As such, the time delay for signal transmission through can be easily calculated based on the length of the connection 40. In addition, since the modulator 140 and the demodulator 250 both have simple structures, as shown in FIGS. 4 and 6, the time delay for these components are also stable and predictable. Thus, it is possible to correct the time information by the adjustor 270. In some embodiments, the time for signal transmission may be predetermined by measurement, and the adjustor 270 may add this predetermined time delay into the time information.

Figure 8:
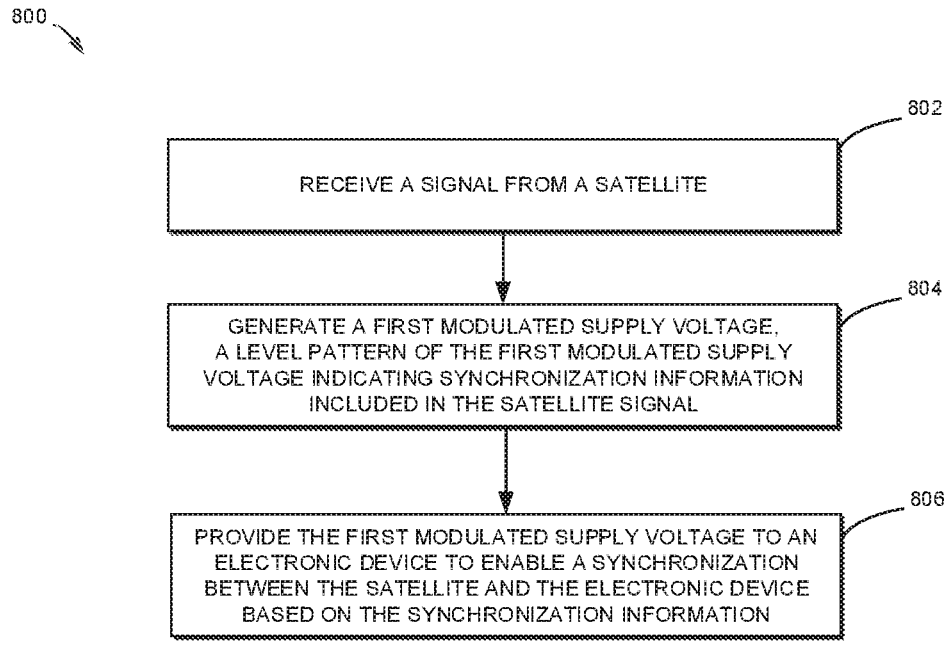
FIG. 8 illustrates a flowchart method for transmitting synchronization information in accordance with some example embodiments of the present disclosure.

FIG. 8 illustrates a method 800 for transmitting synchronization information in accordance with some example embodiments of the present disclosure. The method 800 can be carried out by the power supply devices 100 according to embodiments herein, and the features described above with respect to the power supply device 100 can apply to the method 800. While only three blocks are shown in the method 800, the method 800 may comprise other actions described herein.

At block 802, the power supply device 100 receives a satellite signal from the satellite 30.

At block 804, the modulator 140 of the power supply device 100 generates a first modulated supply voltage. A level pattern of the first modulated supply voltage indicates synchronization information included in the satellite signal. By use of voltage amplitude modulation, the power supply voltage may carry synchronization information.

At block 806, the power supply device 100 provides the first modulated supply voltage to the electronic device 200 to enable a synchronization between the satellite 30 and the electronic device 200 based on the synchronization information.

Figure 9:
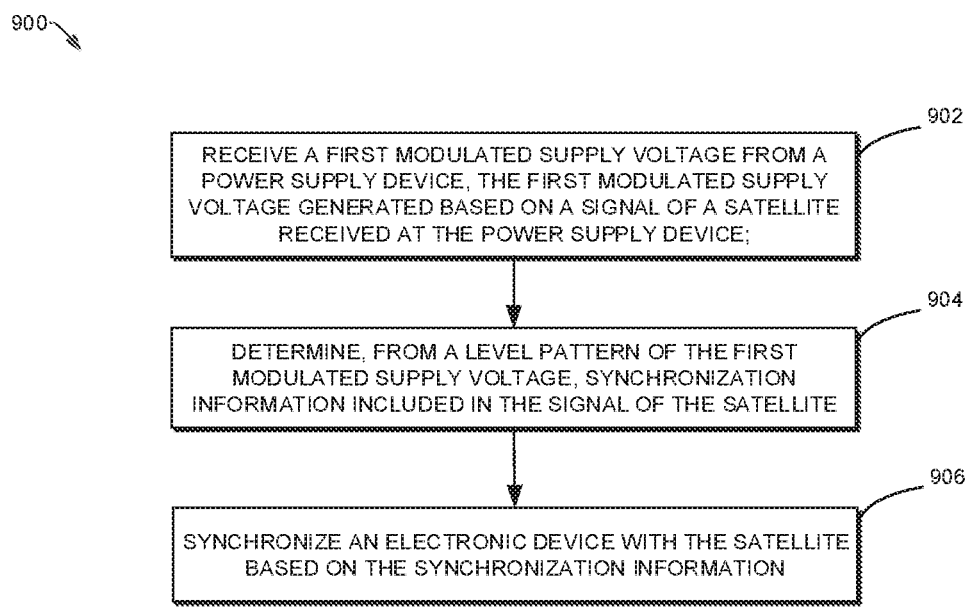
FIG. 9 illustrates a flowchart of a method for device synchronization in accordance with some example embodiments of the present disclosure.

FIG. 9 illustrates a method 900 for synchronization in accordance with some example embodiments of the present disclosure. The method 900 can be carried out by the electronic device 200 according to embodiments herein, and the features described above with respect to the electronic device 200 can apply to the method 900. While only three blocks are shown in the method 900, the method 900 may comprise other actions described herein.

At block 902, the electronic device 200 receives a first modulated voltage from the power supply device 100. The first modulated supply voltage is generated based on a signal of the satellite 30 received at the power supply device 100.

At block 904, the demodulator 250 of the electronic device 200 determines from a level pattern of the first modulated supply voltage synchronization information included in the signal of the satellite 30.

At block 906, the electronic device 200 is synchronized with the satellite 30 based on the synchronization information. For example, the controller 240 receives the synchronization information and aligns local information, such as time and/or location information to the corresponding type of synchronization information.

Figure 10:
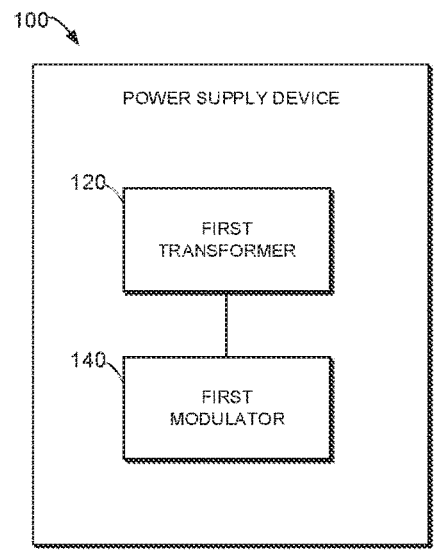
FIG. 10 illustrates a block diagram of an example power supply device according to embodiments of the present disclosure.

FIG. 10 illustrates an example power supply device 100 according to embodiments of the present disclosure. The power supply device 100 comprises a first modulator 140 and a first transformer 120. The first modulator 140 is configured to receive a signal from a satellite 30, and to generate a first modulated supply voltage. A level pattern of the first modulated supply voltage indicates synchronization information included in the satellite signal. The first transformer 120 is configured to provide the first modulated supply voltage to an electronic device 200 to enable a synchronization between the satellite 30 and the electronic device 200 based on the synchronization information.

Figure 11:
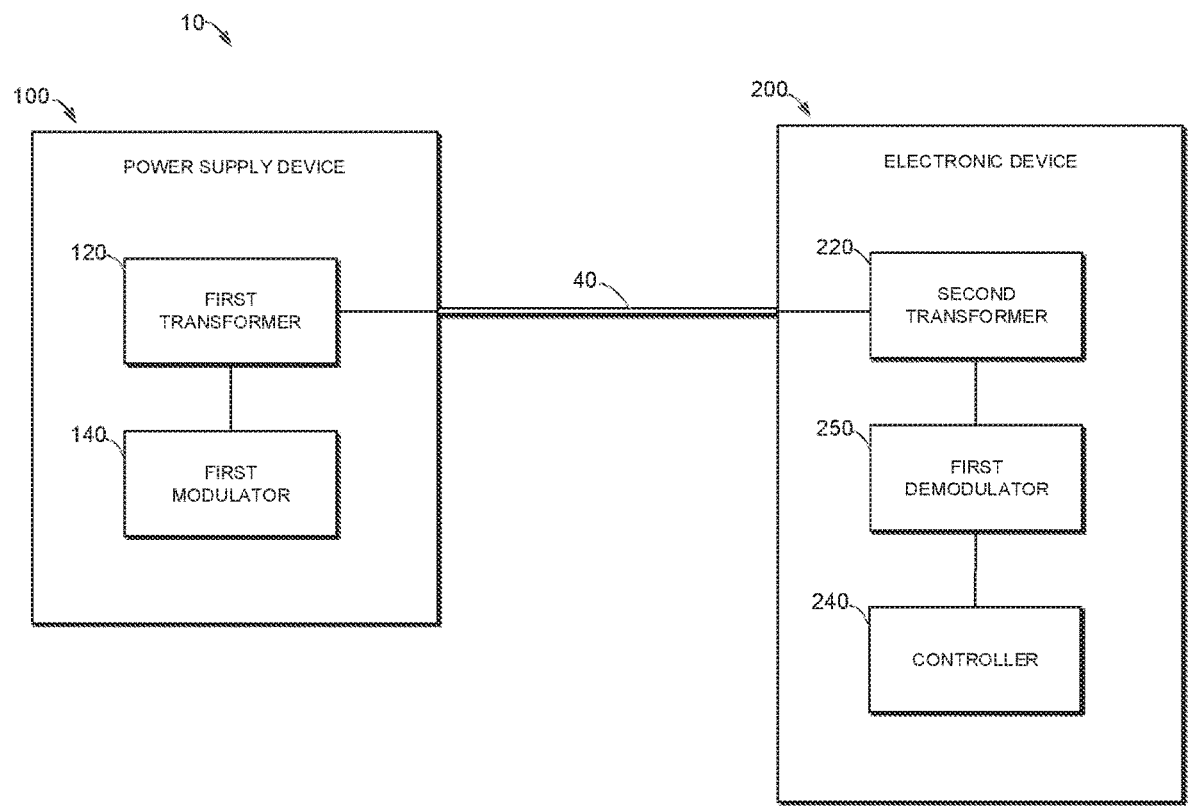
FIG. 11 illustrates a block diagram of an example system according to embodiments of the present disclosure. Throughout the drawings, the same or corresponding reference symbols refer to the same or corresponding parts.

FIG. 11 illustrates an example system 10 according to embodiments of the present disclosure. The system 10 comprises a power supply device 100, a connection 40, and an electronic device 200. The power supply device 100 comprises a first modulator 140 and a first transformer 120. The first modulator 140 is configured to receive a signal from a satellite 30, and to generate a first modulated supply voltage. A level pattern of the first modulated supply voltage indicates synchronization information included in the satellite signal. The first transformer 120 is configured to provide the first modulated supply voltage to an electronic device 200 to enable a synchronization between the satellite 30 and the electronic device 200 based on the synchronization information.

The connection 40 is coupled to the first transformer 120. The electronic device comprises a second transformer 220, a first demodulator 250 and a controller 240. The second transformer 220 is coupled to the connection 40 and configured to receive the first modulated supply voltage from the first transformer 120 via the connection 40. The first demodulator 250 is configured to determine, from the level pattern of the first modulated supply voltage, the synchronization information. The controller 220 is configured to synchronize the electronic device 200 with the satellite 30 based on the synchronization information.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single implementation. Conversely, various features that are described in the context of a single implementation may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A power supply device comprising:
 a first modulator configured to receive a signal from a satellite and to generate a first modulated supply voltage, a level pattern of the first modulated supply voltage indicating synchronization information included in the signal; and
 a first transformer configured to provide the first modulated supply voltage to an electronic device to enable a synchronization between the satellite and the electronic device based on the synchronization information;
 wherein the power supply device comprises a power supply equipment (PSE) of Power over Ethernet (PoE).

2. The power supply device of claim 1, further comprising:
 a second modulator configured to receive the signal from the satellite and to generate a second modulated supply voltage, a level pattern of the second modulated supply voltage indicating further synchronization information included in the signal,
 wherein the first transformer is further configured to provide the second modulated supply voltage to the electronic device to enable a further synchronization between the satellite and the electronic device based on the further synchronization information.

3. The power supply device of claim 1, wherein the first modulator is further configured to generate the first modulated supply voltage in a time division multiplexing manner, the level pattern of the first modulated supply voltage in different time intervals indicating different types of the synchronization information included in the signal.

4. The power supply device of claim 1, wherein the first modulator comprises a first circuit comprising:
a first transistor coupled between a first node provided with a voltage of a first level and an output node configured to provide the first modulated supply voltage;
a first resistor coupled between the first node and a control terminal of the first transistor;
a second resistor coupled to the control terminal of the first transistor; and
a second transistor coupled between the second resistor and the ground, a control terminal of the second transistor coupled to a second node configured to receive the signal from the satellite.

5. The power supply device of claim 4, wherein the first modulator further comprises a second circuit comprising
a third transistor coupled between a third node provided with a voltage of a second level and the output node;
a third resistor coupled between the third node and a control terminal of the third transistor;
a fourth resistor coupled to the control terminal of the third transistor;
a fourth transistor coupled between the fourth resistor and the ground; and
an inverter coupled between the second node and a control terminal of the fourth transistor.

6. The power supply device of claim 1, further comprising:
a first transceiver configured to communicate data packets with the electronic device via the first transformer.

7. A method comprising:
receiving a first modulated supply voltage from a power supply device, the first modulated supply voltage generated based on a signal of a satellite received at the power supply device;
determining, from a level pattern of the first modulated supply voltage, synchronization information included in the signal of the satellite by comparing the first modulated supply voltage with a predetermined voltage to determine logic values of the synchronization information; and
synchronizing an electronic device with the satellite based on the synchronization information.

8. The method of claim 7, further comprising:
receiving a second modulated supply voltage from the power supply device, the second modulated supply voltage generated based on the signal of the satellite received at the power supply device;
determining, from a level pattern of the second modulated supply voltage, further synchronization information included in the signal of the satellite; and
synchronizing the electronic device with the satellite based on the further synchronization information.

9. The method of claim 7, further comprising:
adjusting time information of the synchronization information based on transmission delay from a first modulator of the power supply device to a first demodulator of the electronic device.

10. An electronic system comprising:
a power supply device comprising
a first modulator configured to receive a signal from a satellite and to generate a first modulated supply voltage, a level pattern of the first modulated supply voltage indicating synchronization information included in the signal; and
a first transformer configured to provide the first modulated supply voltage to an electronic device to enable a synchronization between the satellite and the electronic device based on the synchronization information;
a connection coupled to the first transformer; and
an electronic device comprising:
a second transformer coupled to the connection and configured to receive the first modulated supply voltage from the first transformer via the connection;
a first demodulator configured to determine, from the level pattern of the first modulated supply voltage, the synchronization information; and
a controller configured to synchronize the electronic device with the satellite based on the synchronization information.

11. The electronic system of claim 10, wherein the electronic device further comprises:
a second demodulator coupled to the second transformer to receive a second modulated supply voltage from the power supply device via the connection, and configured to determine, from a level pattern of a second modulated supply voltage, a further synchronization information included in the signal of the satellite.

12. The electronic system of claim 10, wherein the first demodulator comprises a comparator configured to compare the first modulated supply voltage with a predetermined voltage to determine logic values of the synchronization information.

13. The electronic system of claim 10, wherein the electronic device further comprises an adjustor configured to adjust time information of the synchronization information based on transmission delay from the first modulator to the first demodulator.

14. The electronic system of claim 10, wherein the power supply device comprises a power supply equipment (PSE) of Power over Ethernet (PoE), and
the electronic device comprises a powered device (PD) of PoE.

15. The electronic system of claim 10, wherein the power supply device further comprises a first transceiver configured to communicate data packets with the electronic device, and
wherein the electronic device further comprises a second transceiver configured to communicate data with the first transceiver of the power supply device.

16. The electronic system of claim 10, wherein the electronic device further comprising:
a converter configured to convert the first modulated supply voltage to a converted voltage supplied to the controller,
wherein the controller is further configured to operate with the converted voltage.

17. The electronic system of claim 10, wherein the power supply device further comprises:
a second modulator configured to receive the signal from the satellite and to generate a second modulated supply voltage, a level pattern of the second modulated supply voltage indicating further synchronization information included in the signal,
wherein the first transformer is further configured to provide the second modulated supply voltage to the electronic device to enable a further synchronization between the satellite and the electronic device based on the further synchronization information.

18. The electronic system of claim 10, wherein the first modulator is further configured to generate the first modulated supply voltage in a time division multiplexing manner, the level pattern of the first modulated supply voltage in different time intervals indicating different types of the synchronization information included in the signal.

\* \* \* \* \*